No. 692,327. Patented Feb. 4, 1902.
H. D. MOYER.
PROCESS OF SALTING PEANUTS.
(Application filed Nov. 10, 1900.)
(No Model.)
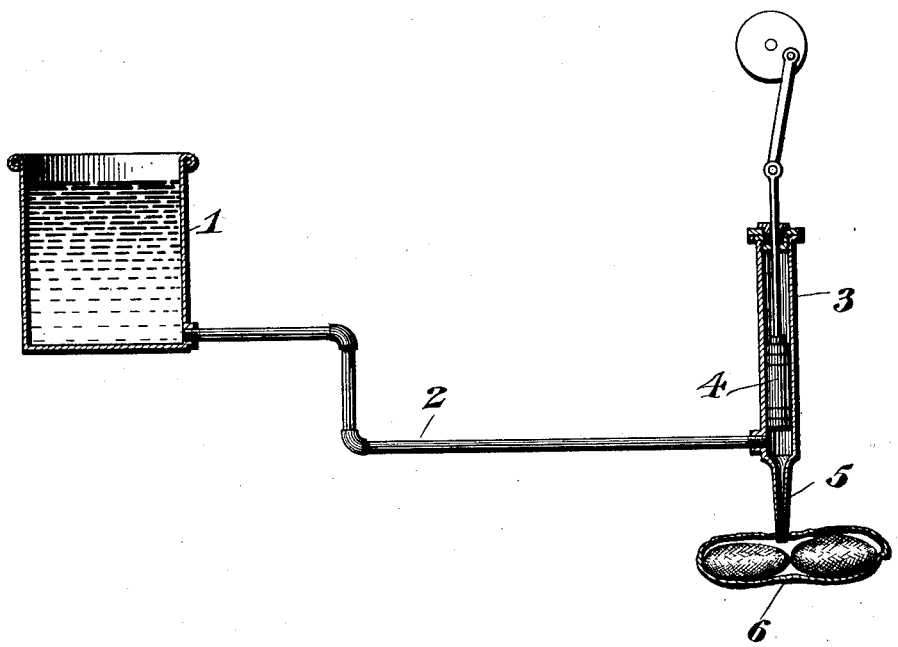
Horace D. Moyer, Inventor
Witnesses
By
Attorney

UNITED STATES PATENT OFFICE.

HORACE DANIEL MOYER, OF HAZLETON, PENNSYLVANIA.

PROCESS OF SALTING PEANUTS.

SPECIFICATION forming part of Letters Patent No. 692,327, dated February 4, 1902.

Application filed November 10, 1900. Serial No. 36,107. (No specimens.)

*To all whom it may concern:*

Be it known that I, HORACE DANIEL MOYER, a citizen of the United States, residing at Hazleton, in the county of Luzerne and State of Pennsylvania, have invented a new and useful Process of Salting Peanuts, of which the following is a specification.

This invention relates to a novel process for salting peanuts; and the object of the process is to impart to peanuts a delicious salinous flavor without removing the kernel from the shell, in order that the salted nuts will not become stale and strong by continued exposure after salting.

To the accomplishment of this end my process comprehends the injection of a saline solution—as, for instance, a strong brine—into the shell, and in a further development comprehends the subsequent evaporation of the surplus fluid by placing the nut in the drier, and, further, the final roasting of the peanuts to impart the delicate flavor most conducive to the acceptance of the product by the trade.

In the accompanying drawing I have illustrated a simple apparatus for carrying out the process or the primary and essential step thereof—to wit, the injection of the brine through the shell of the nut. This device comprises a reservoir 1 for the saline solution or brine and a tube or pipe 2, leading from the reservoir to the cylinder 3 of an injector. Within the cylinder 3 is disposed to reciprocate a suitably-driven plunger 4, designed to force the fluid through the nozzle 5 of the cylinder 3. In carrying out the process the peanut 6 is presented under the nozzle, the latter is forced through the shell, and the plunger is operated to effect the injection of the brine into the shell and the consequent submersion of the nut or kernel.

By reason of the fact that the nut is in its fresh state it will be more readily susceptible to the action of the salt; but the skin or nut-casing will prevent such direct action of the strong solution as would serve to harden or incrust the surface of the nut proper. In one aspect this treatment of the nut by injecting the brine through the shell constitutes the complete process, because the product will be a nut having a desirable salty flavor and remaining incased, and therefore capable of being kept fresh for a considerable period. A further development of the process, however, comprehends the subsequent subjection of the peanut thus treated to the action of heat in a suitable drier. This step effects the evaporation of surplus moisture to promote the final roasting of the nut, which renders the kernel crisp and palatable, so that the product of the process in its ultimate development will be a roasted peanut having imparted thereto the salty flavor which has heretofore been obtained only by submerging the bare nut in a strong brine, which results in the formation of an objectionable incrustation over its surface.

From the foregoing it will be observed that I have originated a novel process for salting peanuts; but it is evident that while I have shown one form of apparatus for carrying out the process the desired end might be effected in a variety of ways. I do not, therefore, wish to limit myself to the use of any particular apparatus or to any predetermined procedure other than such as is embraced by the subjection of the nut to the action of a flavoring substance while in the shell by injecting the substance through a perforation of the shell.

What I claim is—

1. The process of salting peanuts which consists, first, in injecting a saline material into the nut through an opening therein, and afterward roasting the nut.

2. That process for imparting flavor to nuts which consists in subjecting the nut while in the shell to the action of a flavoring liquid, subsequently removing the surplus moisture by evaporation, and finally roasting the nut thus treated.

3. That process for salting peanuts which consists in injecting a saline solution through the shell of the nut, thereafter removing the surplus fluid by evaporation, and finally roasting the nut thus treated.

In testimony that I claim the foregoing as my own I have hereto affixed my signature in the presence of two witnesses.

HORACE DANIEL MOYER.

Witnesses:
JAMES MACKELLAR,
W. T. MACNEAL.